United States Patent Office 3,173,797
Patented Mar. 16, 1965

3,173,797
METHOD OF MAKING EFFERVESCENT CALCIUM CYCLAMATE TABLETS
Hans Lowey, 677 Forest Ave., Larchmont, N.Y.
No Drawing. Filed Aug. 14, 1962, Ser. No. 216,748
8 Claims. (Cl. 99—141)

This invention relates to tablets containing a synthetic non-caloric sweetening material as a substitute for sugar and to procedure for making effervescent tablets therefrom which have new and valuable properties and characteristics. More particularly, the invention is concerned with effervescent calcium cyclamate tablets and their production under controlled conditions.

Effervescent tablets of various types are already known and available. As heretofore produced they are, however, subject to certain recognized disadvantages. Among these disadvantages are the inability to effervesce rapidly and completely in cold or iced drinks, their instability of chemical composition, their development prematurely of carbon dioxide which should normally take place when they are intentionally contacted with moisture or liquids and their relatively short shelf life. In addition, some prior products leave a residue when they effervesce so that a clear sparkling drink or beverage cannot be obtained.

According to the present invention the above and other disadvantages of prior products are overcome. In has been found that in order to obtain the desired qualities in the effervescent tablets it is imperative to carry out their manufacture in the complete absence of any liquids or solvents, whether aqueous or non-aqueous. It has also been found to be essential to subject the final mix to at least one and preferably two slugging operations. A further important factor has been found to be certain protective procedure in the making up of the two mixtures which ultimately become the final mix. Thus, in the present invention a first mixture is produced from sodium bicarbonate and calcium cyclamate and the mixture is exposed for about twenty-four hours to low humidity conditions which must not exceed 30 percent humidity and preferably in the range of 20 to 30 percent humidity; similarly, tartaric acid, insoluble saccharin and polyethylene glycol having an average molecular weight of 3000 to 3700 (Carbowax 4000) are mixed and exposed to low humidity in the same manner as the mixture just-above described, and then the two mixtures are combined into a final mix. It will be observed that the present invention not only omits the use of all liquids in the preparation of the effervescent tablets but avoids the use of heat for drying purposes. The use of heat has been found to be detrimental because it retards effervescence and makes the product more apt to absorb moisture thereby resulting in a short shelf life.

The present invention will be described in terms of a formulation which produces 2,421,328 tablets with the understanding that other quantities of the ingredients can be employed in any desired fraction or multiple of the amounts. For this purpose the total overall formulation is as follows:

| | Pounds |
|---|---|
| Calcium cyclamate | 267 |
| Insoluble saccharin | 27 |
| Sodium bicarbonate | 73.5 |
| Tartaric acid | 60 |
| Carbowax 4000 | 4.5 |

Each tablet has the following composition:

| | Milligrams |
|---|---|
| Calcium cyclamate | 50 |
| Insoluble saccharin | 5 |
| Excipient | 25 |

The procedure for making the effervescent calcium cyclamate tablets is carried out dry without the use of any liquids whatsoever and without the use of heat at any stage of the method. In carrying out the method a first mixture is made up of the sodium bicarbonate and calcium cyclamate and such mixture is exposed for approximately twenty-four hours to low humidity conditions wherein the humidity does not exceed 30 percent and is preferably maintained in the range of 20 to 30 percent. In similar manner, the tartaric acid, insoluble saccharin and Carbowax 4000 are mixed and exposed to identical humidity conditions. The two mixtures are then combined into a final mix by passing the combined mixtures through a spiral high power stainless steel mixer for one-half hour. It has been found that by making the final mix in this particular manner no premature reaction or evolution of carbon dioxide occurs thereby contributing to the stability and good effervescing properties of the final tablets.

After the final mix is made as described above, it is transferred to drums or other suitable receptacles lined with polyethylene bags to exclude moisture if the material is not to be used immediately; otherwise, it is then compressed on a single punch heavy duty tablet machine to form slugs, each of which weighs 12 grams. This slugging operation has been found to be essential at this stage in the method in order to obtain perfectly calibrated granules without the use of any of the conventional wet (aqueous or non-aqueous) granulating procedures. The present product cannot be suitably produced even in the presence of a non-aqueous liquid. The large 12-gram slugs are then gradually reduced to required granule size by the use of a Fitzpatrick milling machine in which different size screens are alternated until suitable calibrated and free-flowing granules are obtained which, if not to be used immediately, are placed in polyethylene bags in drums. If desired, the slugging and milling steps may be repeated once as it has been found that while one slugging operation is ordinarily sufficient, in some instances two slugging operations give a somewhat superior product. The calibrated and free-flowing granules are then ready for compression which is carried out on two 51-position rotary tablet machines. Each such tablet is flat, has a diameter of $7/32$ of an inch and weighs 80 milligrams. The thus produced tablets are next sifted into small fiber drums lined with polyethylene bags or packed directly into bottles after, however, they are kept exposed again for approximately twenty-four hours to the low humidity conditions already described. When the tablets are packed into the polyethylene lined drums for storage or shipment, each drum is provided with three air-drying packets which prevent moisture from gaining access to the tablets.

It is a very important part of the present method to carry out all the manufacturing steps of weighing out the ingredients, mixing, slugging and compressing them, and sealing them into drums or other containers in an air-conditioned dehumidified space.

When all the conditions described above are scrupulously followed, very superior effervescent tablets are obtained which effervesce rapidly and completely even in iced drinks or beverages without leaving any residue and, therefore, producing a clear sparkling drink or beverage. By following the above procedure, tablets are obtained which are stable and do not undergo any chemical decomposition even over extensive periods of time so that the tablets have indefinite shelf life without any additional protective measures being taken after the production of the tablets is completed. The new tablets are also characterized by the fact that the sodium bicarbonate and tartaric acid in particular do not react prematurely or partially to develop or evolve carbon dioxide in contrast to effervescent tablets made in accordance with conventional practice.

Tests which have been carried out upon tablets made according to the present invention have a speed of dissolution which is at least equal to any other known product in hot water and hot coffee and is appreciably better in cold water. The inherent stability of the tablets made in accordance with the present invention is definitely superior to any other known calcium cyclamate-saccharin tablet. In a further test, tablets were ground and exposed in a test amount to a 90 percent relative humidity condition for sixteen hours and then placed in a bomb and subjected to high temperature over a prolonged period of time and compared with tablets made by conventional produce under the same test conditions. The pressure which developed in the tablets placed in the bomb was zero pounds for the unexposed tablets and 55 pounds for exposed tablets, whereas a product made in accordance with conventional practice developed zero pounds pressure on the unexposed tablets and 125 pounds pressure on the exposed material, again under 90 percent humidity conditions. These tests demonstrate the inherent and exceptional stability of the present tablets as compared with those produced by known techniques.

What is claimed is:

1. A dry method of making effervescent calcium cyclamate tablets without the use of heat which comprises mixing sodium bicarbonate and calcium cyclamate and exposing the mixture to low humidity conditions not exceeding 30% moisture, mixing tartaric acid, insoluble saccharin and polyethylene glycol having an average molecular weight of 3000 to 3700 and exposing the mixture to low humidity conditions not exceeding 30% moisture, thoroughly mixing the foregoing two mixtures into a final mix, subjecting the final mix to at least one slugging operation, reducing the resulting slugs to calibrated free-flowing granules and compressing the granules into tablets, the method being carried out in an air-conditioned dehumidified space and the tablets being maintained out of contact with air until used.

2. A method according to claim 1 in which the final mix is subjected to two slugging operations and the slugs resulting from the first such operation are reduced to relatively fine form prior to the second slugging operation.

3. A method according to claim 1 in which the ingredients in the first two mixtures are present in the following relative proportions:

| | Pounds |
|---|---|
| Calcium cyclamate (granular) | 267 |
| Insoluble saccharin (granular) | 27 |
| Tartaric acid (granular) | 60 |
| Sodium bicarbonate (granular) | 73.5 |
| Polyethylene glycol having an average molecular weight of 3000 to 3700 | 4.5 |

4. A method according to claim 1 in which the compressed tablets are again exposed to low humidity prior to being introduced into moisture-proof containers.

5. A method according to claim 1 in which the two mixtures are subjected to the action of a spiral high-power stainless steel mixer for approximately one-half hour to produce the final mix.

6. A method according to claim 5 in which subsequent to the production of the final mix the combined materials are transferred into polyethylene lined receptacles to exclude moisture.

7. A method according to claim 1 in which the slugs produced by the slugging operation are gradually reduced to required granule size and off-size granules eliminated therefrom.

8. A method according to claim 1 in which each tablet contains 50 milligrams of calcium cyclamate, approximately 5 milligrams of insoluble saccharin and 25 milligrams of excipient.

References Cited by the Examiner
UNITED STATES PATENTS

| 2,784,100 | 3/57 | Endicott et al. | 99—141 |
| 3,024,165 | 3/62 | Murphy | 167—82 X |

OTHER REFERENCES

Scoville's The Art of Compounding, by Jenkins et al., Ninth Edition, The Blackiston Division, McGraw-Hill Book Company, Inc., New York, 1957, page 99.

A. LOUIS MONACELL, *Primary Examiner.*

BEATRICE H. STRIZAK, *Examiner.*